United States Patent [19]

Baran et al.

[11] Patent Number: 4,954,682

[45] Date of Patent: Sep. 4, 1990

[54] INTERNAL WELD BEAD METALLIZING SYSTEM AND METHOD

[75] Inventors: Ireneusz W. Baran, Chicago; Humberto A. Hijuelos, East Hazelcrest, both of Ill.

[73] Assignee: Maneely-Illinois, Inc., Chicago, Ill.

[21] Appl. No.: 345,683

[22] Filed: May 1, 1989

[51] Int. Cl.[5] .................................................. B23K 9/04

[52] U.S. Cl. .................................... 219/76.14; 29/460; 219/59.1

[58] Field of Search ...................... 219/76.14, 76.1, 64, 219/65, 10.61 R, 59.1; 29/458, 460, 564.1, 564.8; 118/68

[56] References Cited

U.S. PATENT DOCUMENTS 2,754,225 11/1952 Gfeller ................................ 219/76.1

3,768,145 10/1973 Ostrowski ............................ 29/458

*Primary Examiner*—Clifford C. Shaw

*Attorney, Agent, or Firm*—Calfee, Halter & Griswold

[57] ABSTRACT

A system and method for coating the inside diameter of a tube weld bead includes a metallizing head supported in spaced relationship within the tube on a cushion of inert gas and means to atomize metallizing wire in its passage between the coating head and tube to deposit a metallic coating layer on the internal weld bead.

8 Claims, 1 Drawing Sheet

INTERNAL WELD BEAD METALLIZING SYSTEM AND METHOD

FIELD OF THE INVENTION

The present invention relates to a continuous tube forming process, in general, and to a method of coating the internal weld bead formed during the continuous tube making process in particular.

BACKGROUND OF THE INVENTION

Continuous tube making process lines with means to provide an external galvanized coating are well known. For example, reference may be had to Krengel U.S. Pat. Nos. 3,230,615; 3,231,708; 3,256,592 and 3,561,096 and Rossi U.S. Pat. No. 3,908,593 for continuous tube forming and galvanizing disclosures.

The continuously formed galvanized tube is then cut into predetermined lengths for a number of end uses. For example, these lengths may be installed in an electrical wiring system in which the wires run through the insides of the assembled lengths of conduit. Prior to, during and after installation, the internal diameter of the conduit may be exposed to atmospheric or soil conditions, with potential oxidation or corrosion of uncovered tube surfaces being possible. To avoid or minimize such oxidation or corrosion, the internal diameter of the tube is preferably covered with a protective coating to increase its operational life.

Two methods of obtaining a tube having a painted internal diameter are disclosed in Ostrowski U.S. Pat. No. 3,768,145. In the first method, a lance is supported within the formed tube, with the nozzle end thereof being positioned downstream of the weld station and being held in a centered position by spring spacers extending between the lance and the internal tube wall. The nozzle end of the lance has circumferentially spaced spray orifices to discharge paint throughout a 360° extent to coat the entire internal surface of the formed tube.

In the second disclosed method, the flat upper surface of the steel strip, which will become the internal diameter of the tube after forming, is painted in its flat form prior to the forming and welding steps. After welding, the nozzle end of the lance supported by the spring members has an orifice to direct paint to the weld area to apply a "touch up" coat to the seam.

In both modes of operation disclosed in the Ostrowski patent, paint is being applied to the internal diameter of the formed tube. In addition, in the second mode, in which the strip is painted in its flat form prior to welding, the spring loaded centering device is rubbing against the moving tube to possibly abrade or mar the painted surface.

The use of precoated or prepainted steel strip is increasing. However, when the precoated strip is welded, the heat of the welding process and the weld bead formed effectively remove the internal coating at and immediately adjacent to the seam. A lance as shown in the Ostrowski patent could be used to paint the internal weld bead area. However, the spring support and centering mechanism in Ostrowski might abrade or scratch the precoated surface and any paint applied may not be compatible with or as good as the preapplied coating. The spring support and centering mechanism may also be subject to breakage or warpage caused by the heat generated from welding and friction and is also subject to relatively frequent maintenance or replacement.

SUMMARY OF THE INVENTION

The principal object of the present invention is to provide a system and method for coating the inside diameter of a tube weld bead without damaging the pre-applied coat on the rest of the internal diameter surface of the tube. For this purpose, the coating head of the lance, which is inserted into the tube, is supported and centered within the tube by a pressurized cushion of inert gas between the head and tube I.D. The inert gas is passed under pressure through the lance and the coating head against the radially inner surface of the tube to form a pressurized inert gas cushion about the coating head.

It is another object of the present invention to deposit a metallized coating on the radially inner surface of the tube weld bead which is compatible with or identical to the preapplied surface coating. For this purpose, with a pregalvanized strip, a metallizing wire predominantly of zinc is continuously fed through the lance and coating head toward the internal weld bead seam. The metallizing wire and adjacent tube have different electrical potentials imposed thereon to create an electric arc therebetween to cooperate with the weld heat to atomize the metallizing wire for particulate deposit on the internal surface of the weld bead. The heat of the weld and adjacent tube surfaces assists in fusing the deposited metallic coating onto the internal surface of the weld bead and adjacent tube surfaces.

It is still another object of the present invention to utilize a cushion of inert gas to support a coating head in a continuously formed tube and to deposit a metallic coating on the internal bead diameter by atomizing a metallizing wire between the coating head and tube. To accomplish such purpose, a metallizing head is mounted on the end of a hollow lance. The metallizing wire and inert gas are passed through the hollow lance and through discrete passages in the coating head to provide metallizing wire for atomization and the inert gas for the supporting cushion.

Figure 1:
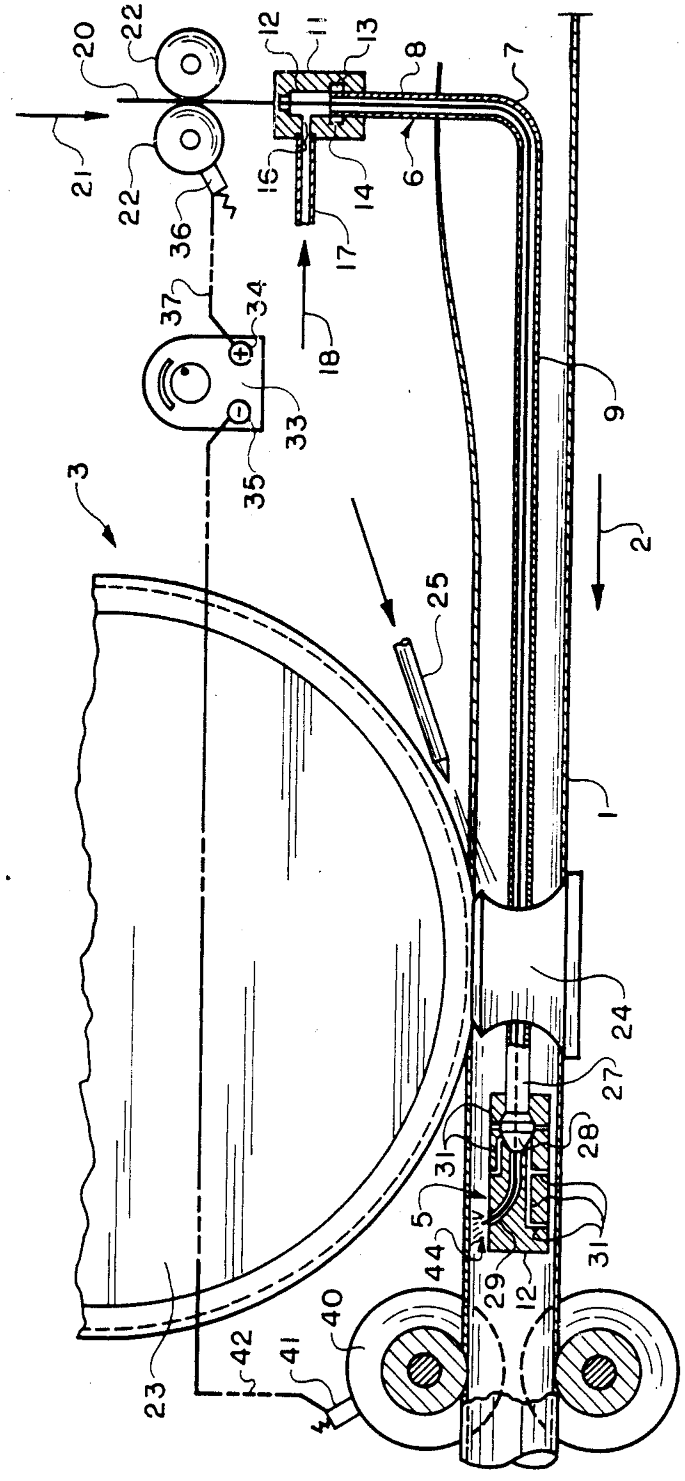
FIG. 1 is a front elevation of the welding station in a continuous tube forming process line, with the tube and lance being shown in longitudinal cross section to illustrate the details of the lance and coating head of the present invention.

DETAILED DESCRIPTION OF THE PREFERRED EMBODIMENT.

In a continuous tube forming process, a flat steel strip is continuously driven through forming rolls to progressively bend the strip into tubular shape for continuous welding along the seam formed. The flat strip may be precoated with paint or a metallized coating, on one or both sides, prior to the forming process. In the present invention, at least the upper surface of the steel strip on the tube mill is precoated for steel protection purposes. In the preferred electrical conduit application, both surfaces of the steel strip are galvanized in the flat form of the strip.

The upper surface of the steel strip during formation of the tube in the process line becomes the inside diameter of the formed tube. As the formation of the tube proceeds, the lateral edges of the strip are brought into or close to abutment with one another for welding to form the tube seam.

As viewed in FIG. 1, the tube 1 is continuously being driven in the direction of arrow 2 through the welding station, indicated generally at 3. A lance assembly, indicated generally at 5, is inserted into the tube 1 just upstream of the edges of the strip being brought into engagement with one another.

The lance assembly 5 includes a hollow tubular member, indicated generally at 6. The inner diameter surface of the tube 6 is lined with a dielectric coating, such as Teflon. The tubular member 6 is bent at 7 to form a vertical section 8, which extends through the space between the lateral edges of the tube, and a horizontal section 9, which longitudinally extends down the center of the tube 1. The upper end of the vertical section 8 of tube 6 is connected to a manifold 11, and the inner end of the horizontal section 9 of tube 6 has a coating head 12 mounted thereon.

The upper end of the vertical section 8 of tube 6 extends into a central, vertical bore 12 in manifold 11. An annular seal 13 is positioned in a groove 14 in the inside diameter of bore 12. The seal 13 is compressed between the outer diameter of the hollow tube 6 and the groove 14 to form a fluid tight seal between the tube and manifold body. A horizontal spur passage 16 extends through the manifold wall to main bore 12.

A supply line 17 for pressurized inert gas is coupled and sealed to spur passage 16. Inert gas under pressure is continuously introduced into the manifold, as schematically indicated by arrow 18. This inert gas passes through the manifold 11 and tube 6 to the coating head 12. In such passage, the inert gas tends to surround a continuously fed metallizing wire 20.

The metallizing wire 20 is drawn from a large supply spool, not shown. The metallizing wire preferably is the same metal as or compatible to the coating on the internal diameter of the formed tube. For example, in the preferred process of making galvanized electrical conduit, the metallizing wire is principally zinc to be compatible with the preapplied galvanized or zinc coating.

The metallizing wire 20 is drawn off of the spool in the direction of arrow 21 by passing through the nip of drive roller pair 22. The wire 20 is threaded through an orifice in the upper end of manifold 11 and sequentially passes through main bore 12 of manifold 11 and the hollow bore of tubular member 6 to the coating head 12. The metallizing wire 20 tends to be floated in generally centered relationship within the tube 6 by the pressurized inert gas simultaneously moving through the tube and metallizing head 12. Even if the wire sags along its length in the horizontal section 9 of tube 6, the internal dielectric lining of tube 6 provides a slippery surface to enhance wire feed to the coating head.

The metallizing head 12 is positioned just downstream of the welding electrode 23. The diametrically opposed weld rolls 24 mounted on vertically extending shafts maintain the edges of the tube in abutment while those edges are being welded together by welding electrode 23. Inert gas may be directed toward the welding station and into the tube by a pressurized inert gas nozzle, schematically shown at 25. The introduction of the inert gas to the tube at the weld location minimizes oxidation at the weld.

The coating head 12 includes a body made of dielectric material. The body has a cylindrical inlet passage 27 opening from its upstream end and communicating with a central cavity 28. The distal end of the horizontal portion 9 of hollow tubular lance member 6 is tightly received in and sealed to the cylindrical inlet opening 27. The wire and inert gas continuously passing through hollow tubular member 6 thus enter the central cavity 28 of coating head 12.

A passage 29 extends from the forward or downstream end of the central cavity 28 to the upper wall of the coating head body. This passage 29 is gently curved as illustrated to point toward the inside diameter of the weld bead forming the seam of the finished tube. The metallizing wire 20 is continuously fed through passage 29 to deposit a metallized coating on the internal weld bead diameter surface, as described in more detail below.

The coating head 12 is supported within the tube 1 in spaced relationship therefrom by a cushion of pressurized inert gas. For this purpose, a plurality of gas ports 31 extend from the central cavity 28, through the coating head 12 to the various outer surfaces thereof. The pressurized inert gas flowing through the tube 6 into the central cavity 28 bifurcates and passes through the respective gas ports 31 to impinge against the inside diameter of the tube. This pressurized inert gas passing through gas ports 31 forms an inert gas cushion about the coating head 12 to support the same within the tube in a generally centralized position spaced from the tube.

The number and direction of the gas ports 31 are selected to balance the gas pressures acting on the different outer surfaces of the die head as required to allow the die head to "float" in a central position in the tube. By utilizing a pressurized inert gas cushion, no mechanical support means extend from the coating head to the inside diameter of the tube. Therefore, the precoated inside diameter of the tube is not abraded or marred by mechanical support structure during the welding process or the bead metallization process.

For the bead metallization process, the metallizing wire has a different electrical potential than the tube to create an electric arc therebetween. For this purpose, an electrical power supply 33 is provided having a positive terminal 34 and a negative terminal 35. The metallizing wire 20 is electrically connected to the positive terminal 34 by drive wheel 22, brush assembly 36 and wire 37. The tube 1 is electrically connected to the negative terminal 35 by tube contact wheel 40, brush assembly 41 and electrical wire 42. The wire 20 thus has a positive electrical potential, while tube 1 has negative electrical potential. The electrical circuit is completed by an electric arc being created therebetween.

This electrical arc, in conjunction with the heat of the tube weld, atomizes the metallic wire 20 as it continuously passes between the coating head 12 and the tube 1. During atomization, the wire 20 breaks or divides into a plurality of metallic particles, as schematically indicated at 44. These metallic particles are deposited on the internal diameter surface of the weld bead. These metallic particles are fused onto the internal weld bead surface by the heat at the weld.

This metallic coating deposited on the internal diameter of the weld bead is preferably the same material used to precoat the internal diameter surface of the tube 1. In the preferred embodiment, a metallizing wire predominantly made of zinc will leave a galvanized coating on the internal weld bead diameter. This galvanized coating matches the galvanized coat pre-applied to the rest of the ID surface to result in a continuous galvanized coating on the entire inner diameter surface of finished tube.

The method of utilizing the present invention is believed to be apparent from the above description. However, a brief description of the method is provided below for purposes of completeness.

The metallic wire 20 is initially threaded through the nip of drive rollers 22, the manifold 11, the tube 6, the central cavity 28 and the curved passage 29. The tube mill is then started continuously to advance the strip for forming and welding. When sufficient strip speed and weld temperatures have been achieved, the power supply is turned on to impose a positive electrical potential on the metallic wire 20 and a negative potential on tube 1. The metallizing wire is then continuously advanced through the lance assembly 5 toward the tube. The metallizing wire is atomized in its passage between the coating head 12 and the tube 1 by the electric arc and the weld temperature. The feed rate of the metallizing wire is coordinated with the tube flow rate to provide sufficient metallic coating coverage for the inside diameter of the weld bead.

It will be apparent from the foregoing that changes may be made in the details of construction and configuration without department from the spirit of the invention as defined in the following claims.

We claim:

1. A system for continuously coating a weld bead on an inside diameter of a tube being continuously formed from flat strip comprising:

a hollow lance extending into the tube being formed and terminating in a coating head positioned downstream from but adjacent to a welding electrode producing the weld bead, which joins abutted side edges of the strip together to complete the tube;

the coating head having a coating passage therethrough directed toward the weld bead and further having port mean therethrough for head support purposes;

means to continuously direct coating material through the lance and coating passage of the coating head to the weld bead area for coating the inside diameter of the weld bead; and means to continuously pass inert gas under pressure through the lance and port means in the coating head to form an inert gas cushion within the tube about the coating head to support the coating head within and in spaced relationship from the tube.

2. The system of claim 1 wherein the coating material is metallizing wire.

3. The system of claim 2 further comprising an electrical circuit including an electrical power supply having a positive terminal and a negative terminal and circuit means electrically to connect the positive terminal to one of either the wire or tube and the negative terminal to the other of either the tube or wire.

4. The system of claim 3 wherein an electric arc between the metallizing wire and tube of different electrical potentials assists in atomizing the metallizing wire as it leaves the coating head to deposit a metallic coating on the inside diameter of the weld bead.

5. The system of claim 4 wherein the strip is precoated with metal prior to tube forming and the metallizing wire is substantially the same metal as the strip coating.

6. A system for continuously coating a weld bead on an inside diameter of a tube being continuously formed from flat strip comprising:

a hollow lance extending into the tube being formed and terminating in a coating head positioned downstream from but adjacent to a welding electrode producing the weld bead, which joins abutted side edges of the strip together to complete the tube;

the coating head having a coating passage therethrough directed toward the weld bead and port means;

means to support the coating head within but spaced from the tube on a cushion of inert gas, said support means including means to contiously pass inert gas through the lance and port means to form said inert gas cushion within the tube about the head;

means for continously feeding metallizing wire through the lance and coating passage of the coating head toward the weld bead; and electric circuit means for applying a positive electrical potential to one of either the wire or tube and a negative electrical potential to the other of either the tube or the wire to create an electric arc therebetween to assist in continously atomizing the metallic wire as it leaves the coating head to deposit a metallic coating layer on the internal diameter of the weld bead.

7. A method for continuously coating the inside diameter of a weld bead comprising the steps of:

forming a flat metal strip into tubular shape with side edges thereof closely adjacent one another;

welding the side edges together with a welding electrode to complete the tube, with a weld bead being formed thereby;

inserting a lance into the formed tube upstream of the strip edges being closely adjacent one another;

mounting a coating head on the inserted lance within the tube adjacent to and downstream from the welding electrode;

supporting the coating head within and in spaced relationship from the tube on a cushion of inert gas;

passing inert gas under pressure through the lance and coating head to form the cushion of inert gas;

directing metallizing wire through the lance and coating head toward the weld bead and atomizing the metallizing wire between the coating head and weld bead to deposit a layer of metallic coating on the inside surface of the weld bead.

8. The method of claim 7 comprising the further step of imposing a positive electrical potential on either the wire or tube and a negative potential on the other of said tube or wire.

* * * * *